US010732337B2

(12) United States Patent
Godbillon et al.

(10) Patent No.: US 10,732,337 B2
(45) Date of Patent: Aug. 4, 2020

(54) CURVED LIGHT GUIDE FOR PROPAGATING LIGHT RAYS

(71) Applicant: VALEO VISION, Bobigny (FR)

(72) Inventors: Vincent Godbillon, Bobigny (FR); Christophe Valois, Meslin L'Eveque (BE)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/941,220

(22) Filed: Mar. 30, 2018

(65) Prior Publication Data

US 2018/0284335 A1 Oct. 4, 2018

(30) Foreign Application Priority Data

Mar. 31, 2017 (FR) .................................. 17 52785

(51) Int. Cl.
| | |
|---|---|
| G02B 6/02 | (2006.01) |
| F21V 8/00 | (2006.01) |
| F21V 3/04 | (2018.01) |
| F21W 106/00 | (2018.01) |
| F21W 102/00 | (2018.01) |
| F21W 103/00 | (2018.01) |

(52) U.S. Cl.
CPC .............. G02B 6/001 (2013.01); F21V 3/049 (2013.01); G02B 6/0045 (2013.01); F21W 2102/00 (2018.01); F21W 2103/00 (2018.01); F21W 2106/00 (2018.01); G02B 6/0036 (2013.01)

(58) Field of Classification Search
CPC ........ G02B 6/001; G02B 6/0045; F21V 3/049
USPC ........................................................ 362/551
See application file for complete search history.

(56) References Cited

U.S. PATENT DOCUMENTS

| 7,744,230 B2 * | 6/2010 | Mezouari | G01D 11/28 |
| | | | 362/23.07 |
| 8,251,527 B1 * | 8/2012 | Freier | G02B 6/0096 |
| | | | 359/852 |

(Continued)

FOREIGN PATENT DOCUMENTS

| DE | 10 2013 011 864 A1 | 2/2015 |
| EP | 2 746 647 A2 | 6/2014 |

(Continued)

OTHER PUBLICATIONS

French Preliminary Search Report dated Nov. 23, 2017 in French Application 17 52785 filed on Mar. 31, 2017 (with English Translation of Categories of Cited Documents).

*Primary Examiner* — Evan P Dzierzynski
*Assistant Examiner* — Keith G. Delahoussaye
(74) *Attorney, Agent, or Firm* — Oblon, McClelland, Maier & Neustadt, L.L.P.

(57) ABSTRACT

A light guide intended to propagate light rays emitted from at least one light source, the light guide including at least three successive portions in a direction of propagation of the light rays from the one or more light sources, the three successive portions being a first portion, a second portion located immediately after the first portion, the second portion following a curve defined by a main radius of curvature, and a third portion located immediately after the second portion. According to the invention, at least one slit is produced in the second portion, the one or more slits defining at least two sub-guides, the sub-guides joining so as to form the third portion of the light guide.

20 Claims, 7 Drawing Sheets

(56) References Cited

U.S. PATENT DOCUMENTS

| | | | | |
|---|---|---|---|---|
| 8,545,070 | B2* | 10/2013 | Sakiyama | B60Q 1/2665 362/494 |
| 2012/0027344 | A1* | 2/2012 | Krijn | G02B 6/125 385/32 |
| 2013/0128620 | A1* | 5/2013 | Kosuge | G02B 6/0035 362/623 |
| 2014/0063847 | A1* | 3/2014 | Sakamoto | G02B 6/0031 362/609 |
| 2014/0177260 | A1 | 6/2014 | George et al. | |

FOREIGN PATENT DOCUMENTS

| | | | |
|---|---|---|---|
| FR | 2 882 979 A3 | 9/2006 | |
| WO | WO 2013/114376 A1 | 8/2013 | |
| WO | WO-2017027215 A1 * | 2/2017 | G02B 6/001 |

* cited by examiner

Fig. 7B                    Fig. 7C

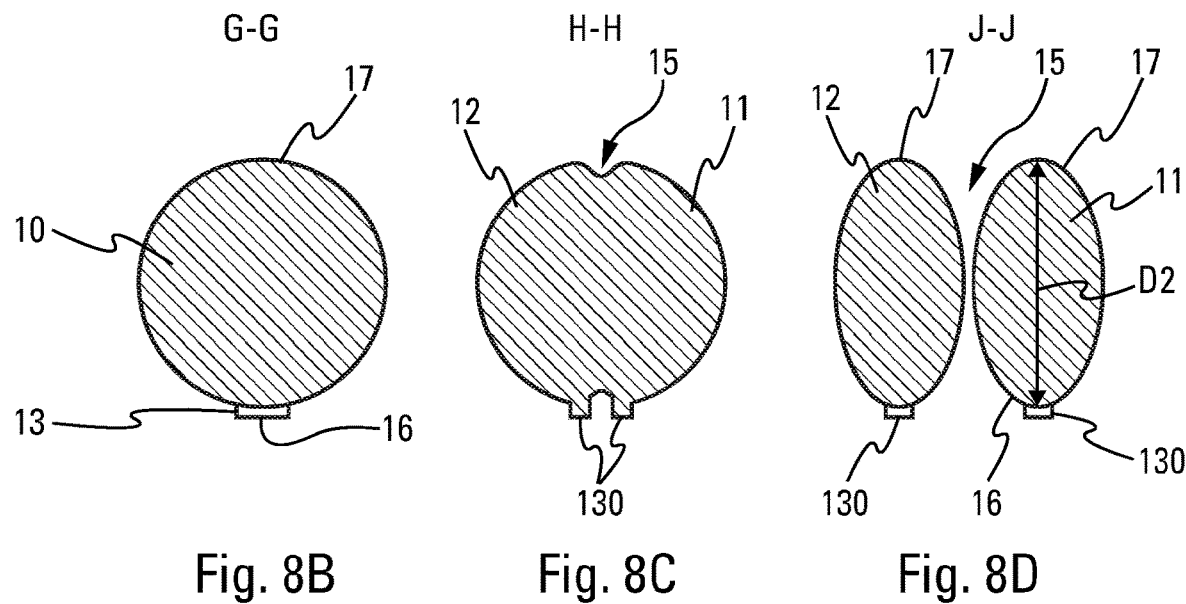
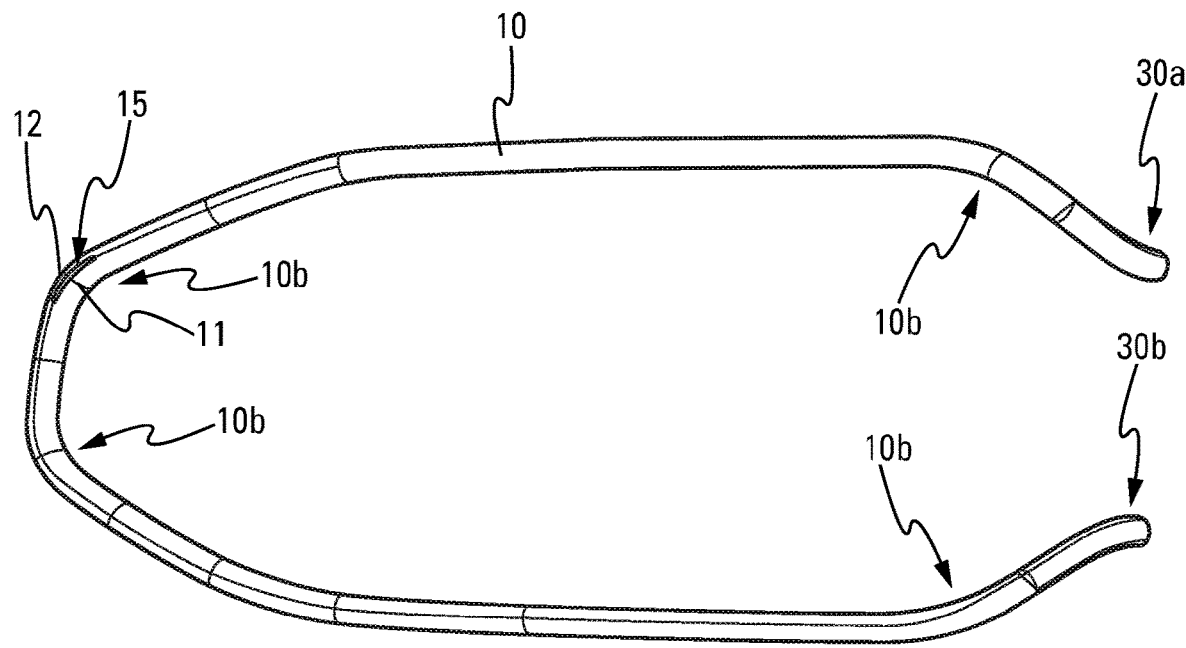

CURVED LIGHT GUIDE FOR PROPAGATING LIGHT RAYS

The field of the present invention is that of guides for propagating light rays and more particularly that of guides intended to be installed in lighting modules of motor vehicles in order to provide a lighting and/or signaling and/or interior-lighting function.

As is known per se guides for propagating light rays, also called light guides, are employed in order to control the form of propagation of light rays, in particular with a visual and esthetic purpose.

Drawbacks regarding prior-art light guides comprising at least one curved portion are illustrated by FIGS. 1A to 1D. FIG. 1A shows a light guide 1 comprising a curved portion 2. A light source 4 is placed a one end 3 of the light guide 1. FIG. 1B shows an enlargement of the curved portion 2 of the light guide 1 passed through by light rays 45 emitted by the light source 4. Depending on the angle of incidence made between the rays 45 generated by the light source 4 and the walls of the light guide 1, light rays 6 are reflected by the walls of the light guide 1 and light rays 8 are refracted by the walls of the light guide 1.

A first drawback regards the presence of refracted rays 8 in undesired zones of the light guide 1 and in particular in the curved portion 2 of the light guide 1. These refracted rays 8 represent both a substantial leakage of light in the curved portion 2 of the light guide 1 and illumination of the exterior environment located around the curved portion 2. Thus, such light guides 1 have a visual and esthetic appearance that is not completely controllable because the desired propagation of the light rays is not achieved. Furthermore, the refracted rays 8 are lost and the photometric efficiency of the light guide is then affected thereby.

Moreover, a second drawback relates to curved light guides 1 having a small radius of curvature. A radius of curvature is said to be small when it is smaller than N times the diameter of the light guide 1, with N being dependent on the material of the light guide and its refractive index.

Independently of the index, it will be understood that if the radius of curvature is larger than or equal to N times the diameter of the light guide with a value of N that is high, no notable flaw in the propagation of the light rays will be observed, i.e. the appearance of the guide when illuminated and its photometric efficiency will both be satisfactory.

In the case of a small radius of curvature, a substantial amount of the light may escape from the guide in the dogleg. As is in particular illustrated by FIG. 1B, the light rays 45 emitted by the light source 4, whether they be reflected 6 or refracted 8, do not pass through an internal zone 5 located in the hollow of the curved portion 2. This internal zone 5 of the curve of the light guide 1 is therefore not illuminated, and what is called a shadowed zone represented by the hatching in FIG. 1B forms.

FIGS. 1C and 1D show curved portions 2 of light guides 1 according to the prior art, with, in FIG. 1C, a first light guide having, with reference to the definition given above, what is called a small radius of curvature RC (FIG. 1C) whereas the radius of curvature RD of the second light guide of FIG. 1D is not small, i.e. it is larger than or equal to N times the diameter of the light guide. It may then be seen that when the radius of curvature of the curved portion 2 of the light guide 1 is small, the light rays emitted by the light source 4, whether they be reflected 6 or refracted 8, do not pass through the internal zone 5 located in the hollow of the curved portion 2 and a shadowed zone represented by the hatching in FIG. 1C forms.

Thus, in light guides 1 having a small radius of curvature, in addition to there being substantial leakage of light in the curved portion 2, which leakage is represented by the refracted rays 8, the internal zone 5 located in the hollow of each curved portion 2 is not passed through by light rays, whether they be emitted 45, reflected 6 or refracted 8. This internal zone 5 thus shadowed then modifies the visual appearance that it is desired to give to the light guide through the interior of which the light rays propagate. Furthermore, it may be seen in FIG. 1D, in which the radius of curvature RD in the curved portion 2 of the guide is not small, that the leakage of light is less, i.e. that the number of rays refracted 8 out of the guide, and thus lost, is smaller than the number of ray 8 refracted out of the guide shown in FIG. 1C, the radius of curvature RC of which in the curved portion 2 of the guide is small. Thus, the guide with a small radius of curvature has a degraded photometric efficiency.

In order to preserve a good photometric efficiency and to avoid this shadowed zone and this esthetic defect that is created by the modification in this overall visual appearance, the use of light guides having one or more small radii of curvature is limited. This constraint is however disadvantageous in a context in which customer requirements require light guides having small radii of curvature to be increasingly employed.

The aim of the present invention is therefore to remedy these drawbacks by providing a light guide intended to propagate light rays emitted from at least one light source, the light guide comprising at least three successive portions in a direction of propagation of the light rays from the one or more light sources, the three successive portions being a first portion; a second portion located immediately after the first portion, the second portion following a curve defined by a main radius of curvature; and a third portion located immediately after the second portion.

According to the invention, at least one slit is produced in the second portion, the one or more slits defining at least two sub-guides, said sub-guides joining so as to form the third portion of the light guide.

The presence of such a slit and the division of the light guide into a plurality of sub-guides allows both the presence of a shadowy zone in the hollow of the curved portion to be avoided and the loss of light due to refraction of the light rays to be decreased.

According to various features of the invention, which features may be employed alone or in combination, provision will possibly be made for the following:
 The sub-guides join opposite the third portion so as to form the first portion. In other words, the sub-guides begin at a junction between the first portion and the second portion.
 The second portion and the third portion are made of the same material and integrally formed. Thus, it will be understood that the second portion and the third portion are unitary.
 The first portion and the second portion are made of the same material and integrally formed. Thus, it will be understood that the first portion and the second portion are unitary.
 The first, second and third portion are made in the same material and integrally formed. Thus it will be understood that these three portions are unitary.
 The sub-guides extend along the length of the slit.
 Each sub-guide has a radius of curvature, called its general radius of curvature, that is inscribed in a circle concentric with a circle in which the main radius of curvature defining the curve followed by the second portion is inscribed.

The at list one slit follows a main radius of curvature that is coincident with the main radius of curvature defining the curve followed by the second portion.

The at least one slit extends right through a height of the light guide. What is meant by this is that there is no bridge of material connecting the two sub-guides. Thus, the sub-guides are independent from one another.

The at least one slit has at least one beveled or rounded end. Such ends allow molding and unmolding of the sub-guides during manufacture of the light guide according to the invention to be facilitated.

The at least one slit has a maximum width larger than or equal to 2 millimeters. This thickness of at least 2 millimeters allows the slit to be molded well during the manufacture of the light guide according to the invention. The maximum thickness of the slit is measured in a transverse plane that is perpendicular to the axis of elongation of the slit, and that is preferably located midway along the latter.

The at least one slit has a width representing at least 10% of the width of the light guide, the widths of the slit and of the light guide here being measured in a transverse plane that is perpendicular to the axis of elongation of the slit, and preferably that is located midway along the latter.

The light guide has a has a maximum width that is constant in at least the three successive portions. A maximum width that is constant in all the portions of guide makes it possible to ensure that the bulk of the guide is similar to the bulk of a guide that is not divided into sub-guides. The maximum width is measured in a transverse plane that is perpendicular to the axis of elongation of the light guide.

The light rays are intended to be propagated from one end of the light guide to another end of the light guide, defining a direction of propagation of the light rays, the three portions following one after the other in the direction of propagation of the light rays.

The first portion of the light guide has a main radius of curvature that is larger than the main radius of curvature followed by the second portion.

The third portion of the light guide has a radius of curvature that is larger than the main radius of curvature followed by the second portion.

The first portion is substantially rectilinear.

The third portion is substantially rectilinear.

The sub-guides have widths, or diameters, that are different from one another. In other words, the slit is not located regularly between each sub-guide, this allowing a maximum of light rays to be concentrated in the shadowed zone located in the hollow of the curve followed by the second portion. The width or the diameter are measured in a right transverse cross section of the sub-guides, i.e. in a transverse plane of the sub-guides that is perpendicular to the axis of elongation of the sub-guides.

The sub-guide having a general radius of curvature that is the smallest has a width or a diameter smaller than the sub-guide having a larger general radius of curvature.

At least one of the sub-guides has a right transverse cross section of semicircular or circular or elliptical or oval or rectangular or trapezoidal shape. When the shape is rectangular or trapezoidal, the corners between adjacent sides may be sharp or rounded. By rounded corner what is meant is that two adjacent sides of the rectangle or of the trapezoid are joined by a fillet. It will be understood here, and below, that by right transverse cross section, what is meant is a cross section in a transverse plane that is perpendicular to the local direction of elongation of the light guide.

Each sub-guide has a right transverse cross section of semicircular or circular or elliptical or rectangular or oval or trapezoidal shape.

The light guide comprises a bridge of material extending between two adjacent sub-guides. This bridge of material makes it possible to ensure that the sub-guides hold together in case of vibrations.

The bridge of material extends the entire length of the slit.

The bridge of material follows the main radius of curvature of the slit.

The bridge of material has a maximum height or thickness that is at least four times smaller than a height of the light guide. More precisely, it is desired to ensure that the maximum thickness of the bridge of material is smaller than one quarter of the height of the guide. This ratio makes it possible to ensure that the bridge of material is smaller than the sub-guides and that there is no optical effect or a small effect on the propagation of the light rays. By small effect, what is meant is that most, and for example more than 75%, of rays having penetrated into a sub-guide continue to propagate in this sub-guide and that at most 25% of these rays pass into the bridge.

The bridge of material has reflecting elements on at least one of its faces. These reflecting elements participate in the reflection of the light rays, allowing the shadowed zone to be compensated for.

Each sub-guide has a lower face on which elements for reflecting light rays are placed and an upper face, which is distinct from the lower face, and through which the light rays exit. In this way, the sub-guides allow light rays to be transmitted through their ray exit face.

The main radius of curvature followed by the second portion is smaller than or equal to N times one diameter of the light guide, with N dependent on the refractive index of the material from which said light guide is produced. Thus, this allows the light guide to have what is called a small radius of curvature while not exhibiting a shadowed zone or leakage of light rays in the curved portion. It will be noted that the diameter of the light guide may be measured in the curved portion of the guide by taking the sum of the diameters of the sub-guides. It will be understood that the radius of curvature may vary along the length of the light guide, and for example along the length of the second portion. It is then necessary to ensure that, for each right transverse cross section of the light guide, and here at least along the length of the second portion of the light guide, the main radius of curvature respects the ratio with respect to the diameter of the light guide.

Another subject of the invention is a motor-vehicle lighting module comprising a light guide such as defined above, and a light source, the light source being placed at one end of the light guide.

The lighting module may furthermore include a translucent or transparent screen behind which the light guide is placed.

Other Features and advantages of the present invention will become more clearly apparent from the description and drawings, in which.

Figure 3:
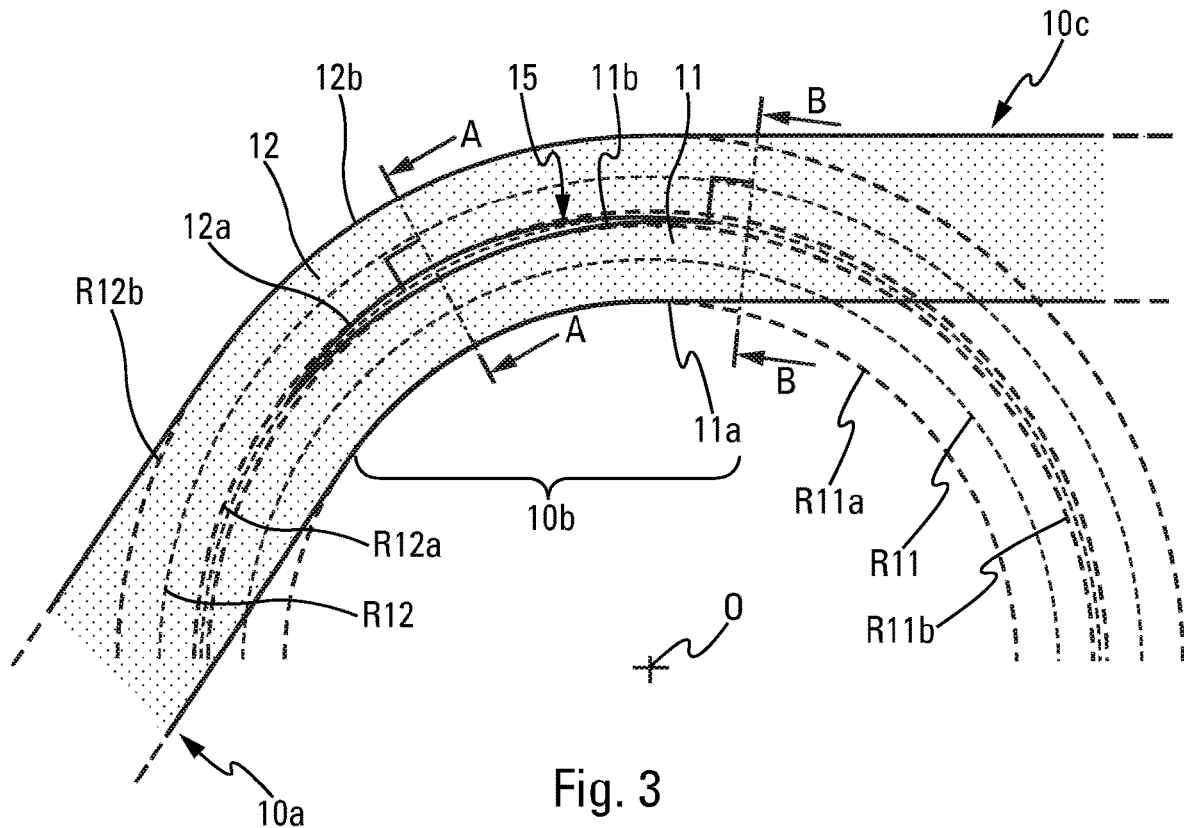
FIG. 3 is a top view of the curved portion of the light guide according to the present invention, showing a first embodiment of a slit produced in the curved portion of the light guide.
Figure 4:
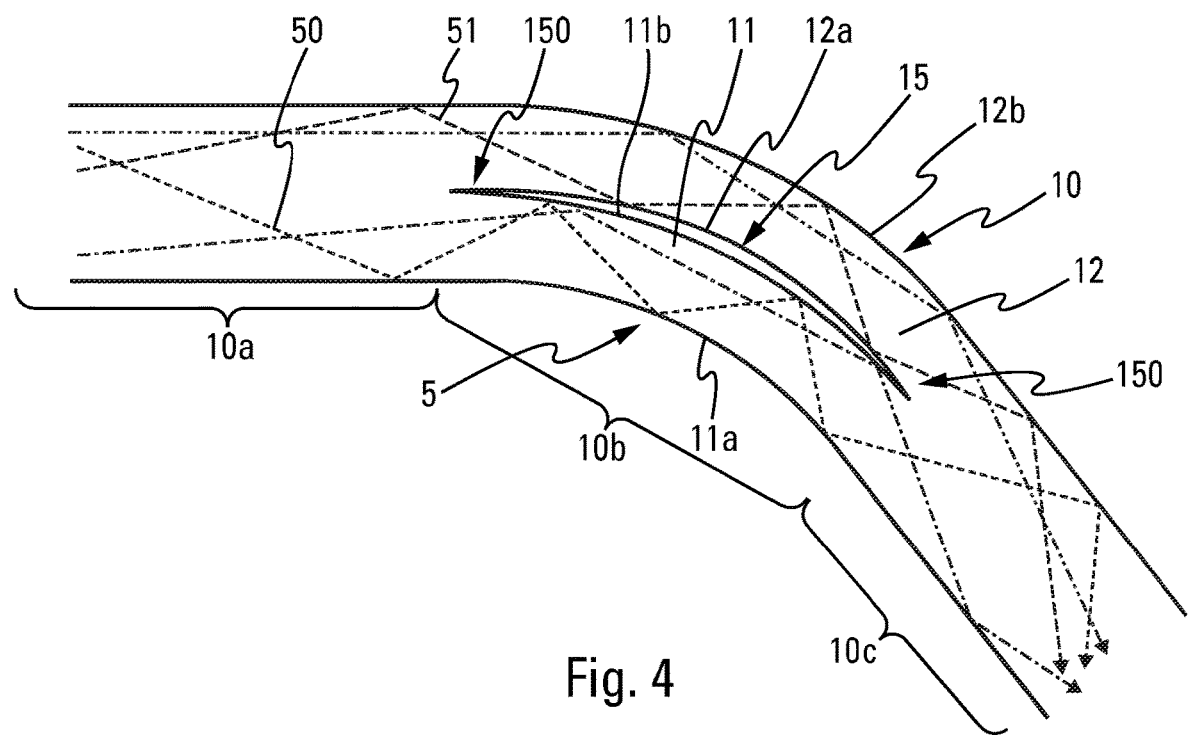
FIG. 4 is a schematic representation of the curved portion of the light guide according to the invention, in which schematic traces of the light rays passing through the guide have been shown.
Figures 6A, 6B, 6C, 6D:
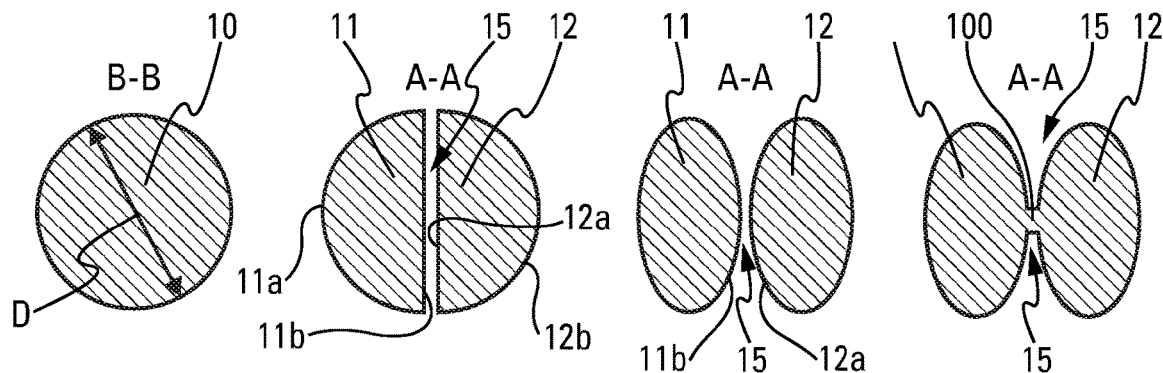
Figure 7A:
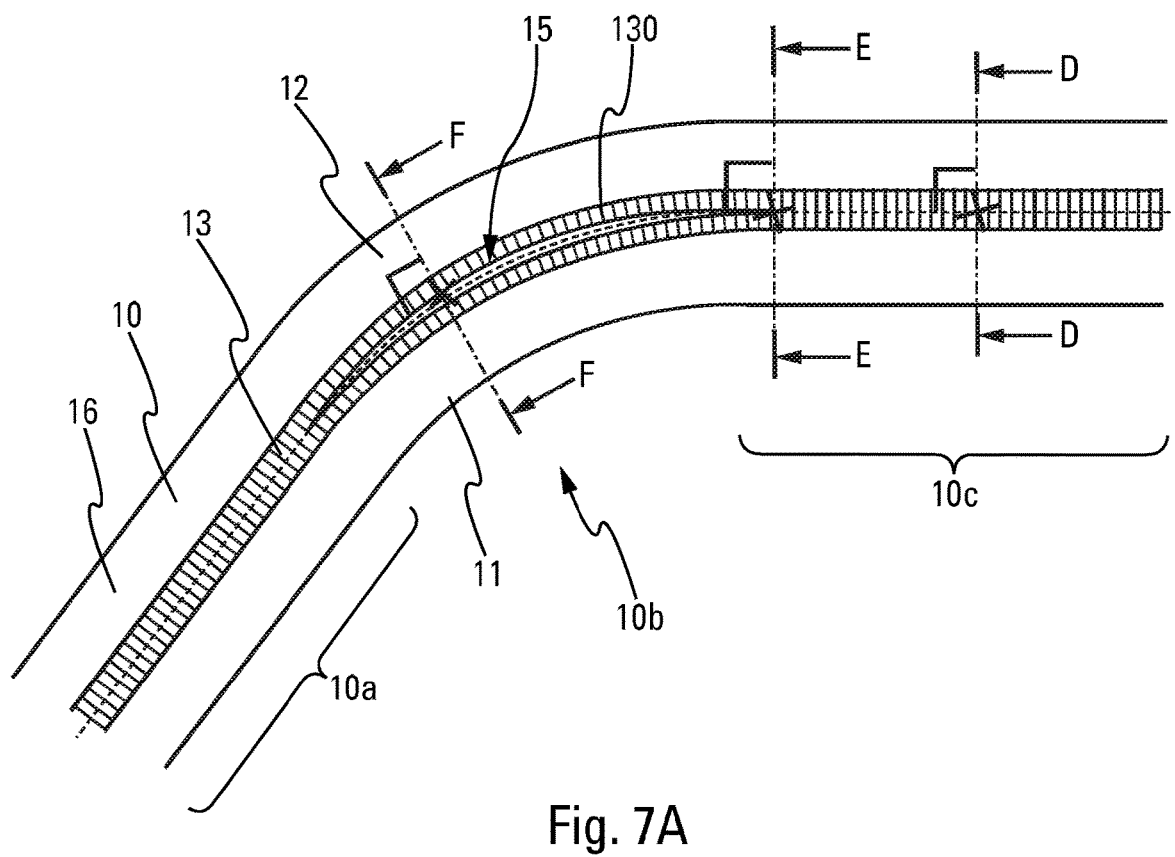
Figure 8A:
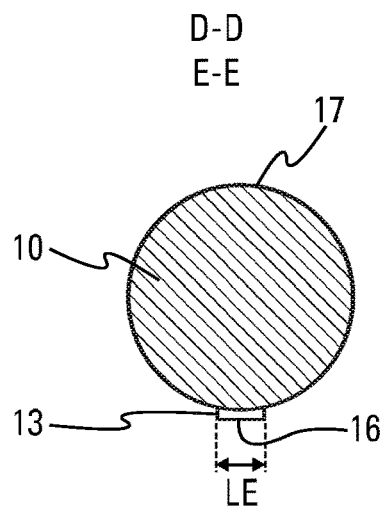
Figure 8A:
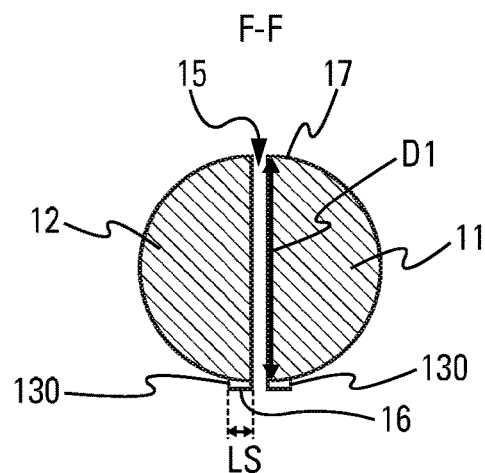
Figure 8A:
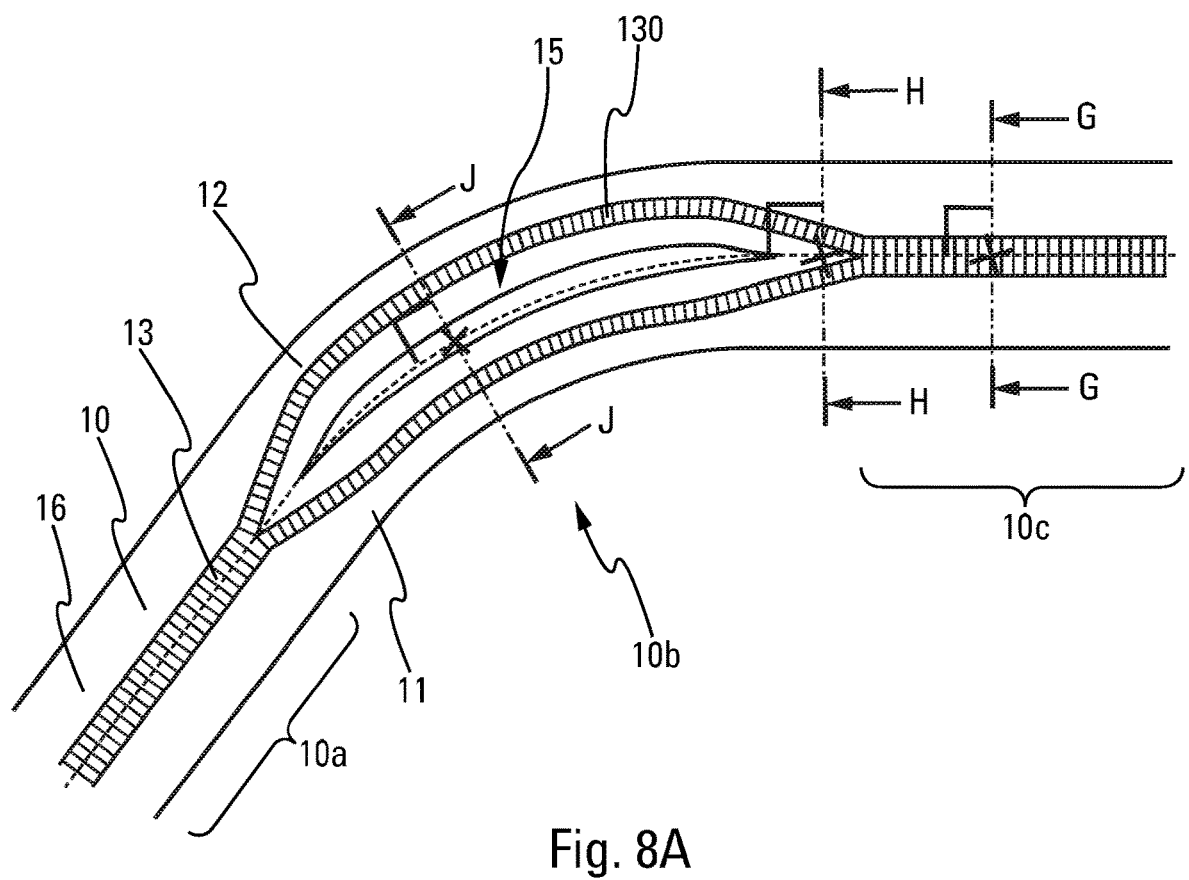

FIGS. 6A to 6D show right cross sections of a light guide according to the invention cut along the sectional lines A-A and B-B shown in FIG. 3, and in which FIG. 6A illustrates a right cross section of a rectilinear portion of the light guide according to the invention and in which FIGS. 6B to 6D show right transverse cross sections of a curved portion of the light guide according to a plurality of variant embodiments of the invention, a first variant in which the sub-guides have a semicircular cross section, a second variant in which the sub-guides have an ellipse-shaped cross section and a third variant in which the sub-guides comprise a bridge of material, the cross sections not showing the reflecting elements for the sake of clarity;

FIGS. 7A to 7C illustrate the light guide of FIG. 4 with a first arrangement of the reflecting elements, with FIG. 7A illustrating the curved portion of the light guide according to the mentioned seen from above and in which FIGS. 7B and 7C illustrate right cross sections cut respectively along the sectional lines D-D, E-E (FIG. 7B) and F-F (FIG. 7C);

FIGS. 8A to 8D illustrate the light guide of FIG. 4 with a second arrangement of the reflecting elements, with FIG. 8A illustrating the curved portion of the light guide according to the invention seen from above and in which FIGS. 8B to 8D illustrate right cross sections cut respectively along the sectional lines G-G, H-H and J-J.

FIG. 9 illustrates a light guide according to one embodiment of the invention intended to be integrated into a motor-vehicle lighting module.

It is firstly necessary to note that the figures illustrate the invention in detail with regard to implementation thereof, said figures possibly of course serving to better define the invention where appropriate. However, it will be noted that these figures illustrate only some of the variant embodiments that are possible according to the invention.

In the following description, the orientation referred to will be according to the following reference system: firstly, a direction of elongation of an element, such as the light guide according to the invention, is defined by its main axis of extension, namely its largest dimension, such as its length. Secondly, a transverse dimension or width is defined perpendicular to the direction of elongation, this transverse dimension or width extending between the two furthest apart points of a right cross section of the light guide while passing through the center of this right cross section. Thirdly, a height is defined perpendicular to both the direction of elongation and to the width. The height, which is distinct from the width, also extends between the two furthest apart points of a right cross section of the light guide while passing through the center of this cross section. Preferably, the height extends from a wall of the guides comprising reflecting elements. Thus, the direction of elongation forms the first axis of the reference system, the width forms the second axis of the reference system and the height the third axis of the reference system. It will be noted that this reference system is nonlimiting as regards the orientation that the light guide may take in its application to a motor-vehicle lighting module. It will be understood that the orientation of the reference system chosen may vary with distance along the length of the guide and with the curvature of the corresponding segment of guide.

Figure 1A:
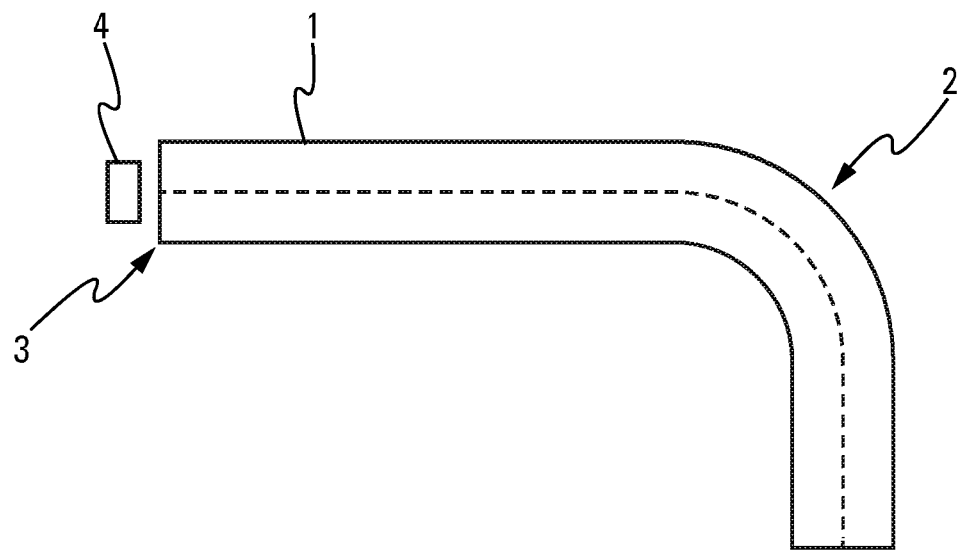
FIG. 1A is a schematic representation of a light guide having a curved portion according to the prior art.
Figure 1B:
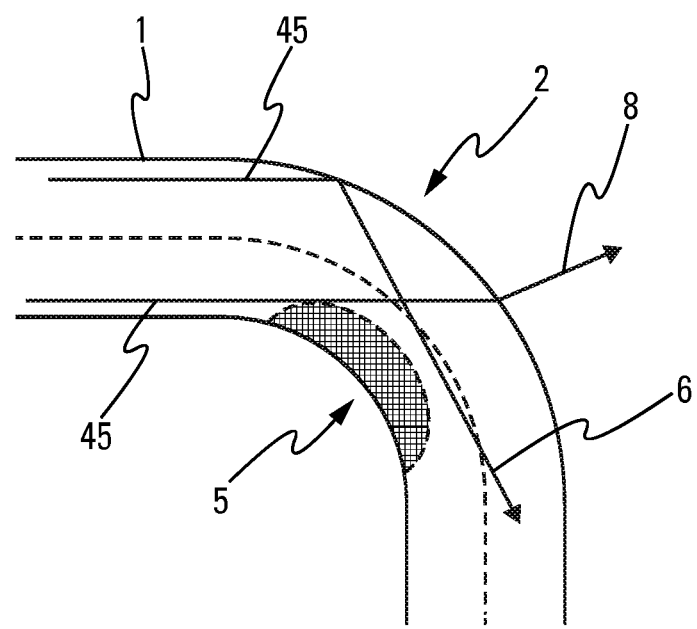
FIG. 1B is an enlargement of the curved portion of the light guide according to the prior art illustrated by FIG. 1.
Figure 1C:
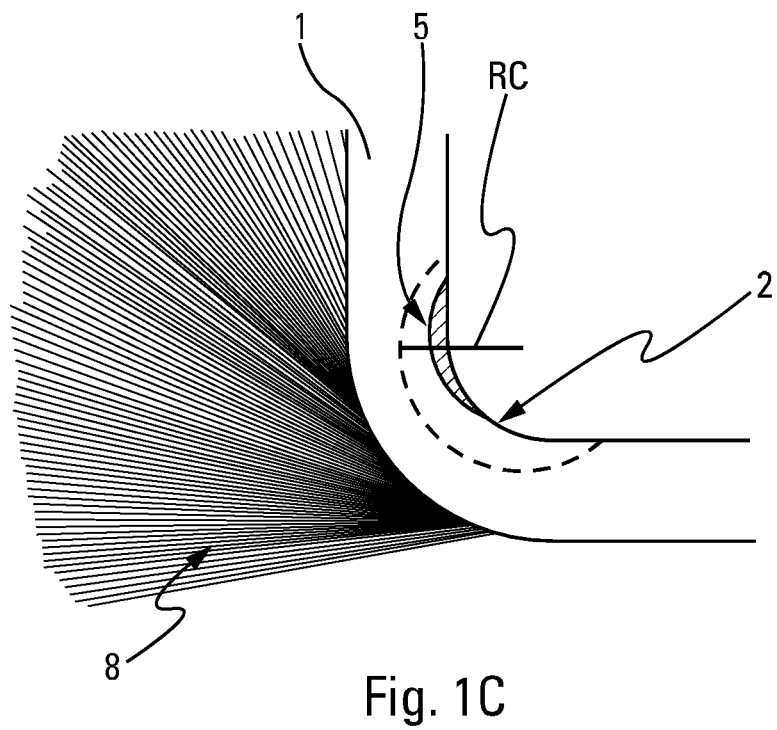
FIGS. 1C and 1D are schematic representations of a light guide of the prior art passed through by light rays respectively having a small radius of curvature and a larger radius of curvature, these figures in particular illustrating the rays exiting from the light guide by refraction in the curved portion.
Figure 1D:
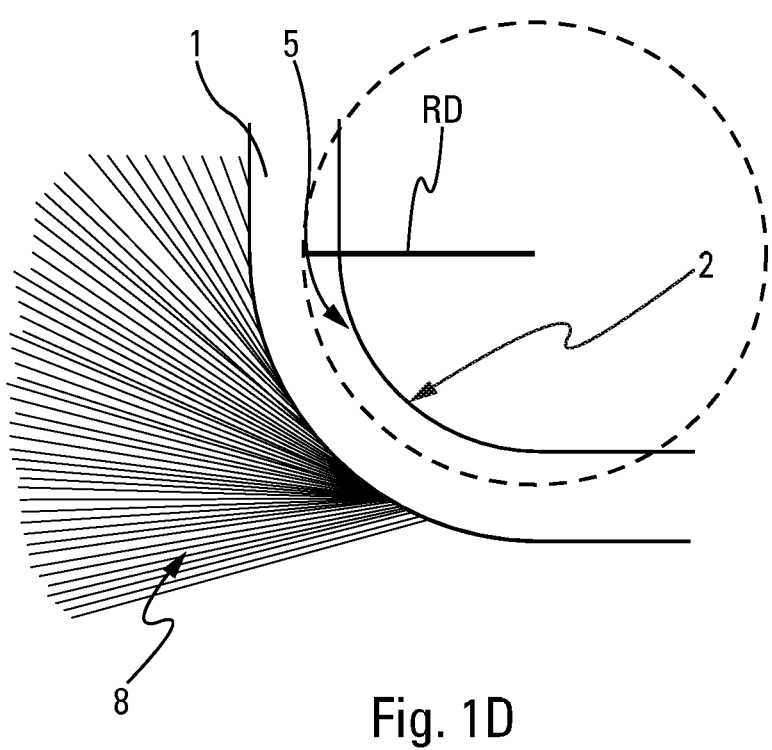
Figure 2:
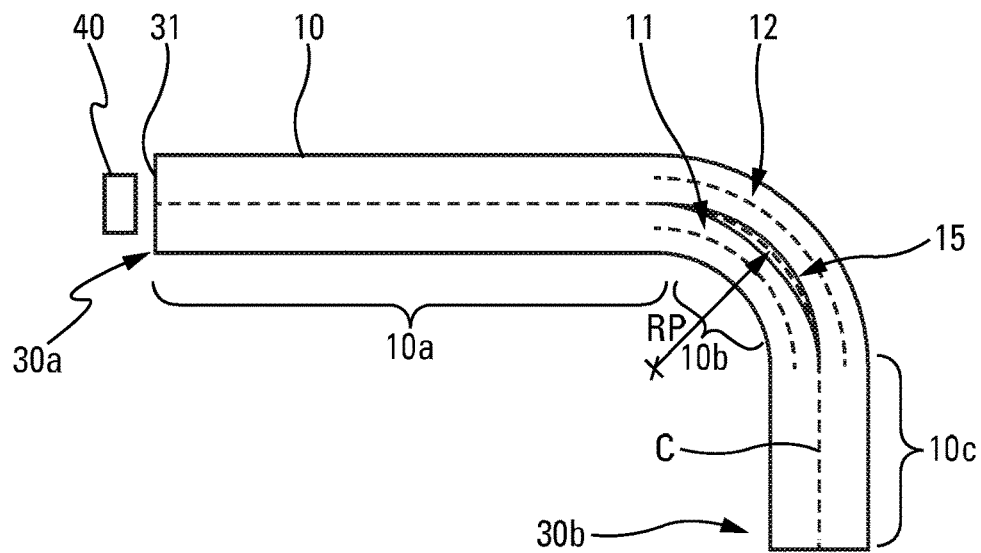
FIG. 2 is a schematic representation of a light guide according to the invention.

FIG. 2 shows a light guide 10 intended to propagate light rays. The light guide 10 has a tubular shape and two ends, namely a first end 30a and a second end 30b. More precisely, one of the ends of the light guide 10, here the first end 30a, includes an entrance face 31 for the light rays. This first end 30a is intended to interact with one or more light sources 40 that emit the light rays. The light rays are then intended to pass through the entrance face 31 then to be propagated from the first end 30a of the light guide 10 in the direction of the opposite end, i.e. the second end 30b. This direction then defines a direction of propagation of the light rays through the light guide.

The light guide 10 also includes a face for reflecting light rays conveyed by the guide 10. This reflecting face includes irregularities, such as for example prisms, that redirect the light rays towards an exit face of the light guide 10, at an angle of incidence that allows them to be refracted out of the guide. The exit face for the refracted light rays is for example opposite the reflecting face, and takes the form of a partially cylindrical wall, i.e. a wall defined by sliding an open profile over a guide curve that extends from one end 30a to the other 30b of the light guide 10. These aspects will be detailed further on in the description. In FIGS. 2 to 4 in particular, the light guide 10 is shown so that the reflecting face is hidden and so that the exit face is that face of the guide which is turned toward the reader.

It will be noted that the second end 30b may comprise a reflecting surface allowing light rays to be reflected back toward the interior of the guide.

The light guide 10 comprises three successive portions 10a, 10b, 10c in the direction of propagation of the light rays, i.e. in the direction such as defined above. It is then possible to differentiate between a first portion boa the first end 30a of which interacts with the one or more light sources 40, a second portion 10b having a curve and located immediately after the first portion 10a and a third portion 10c located immediately after the second portion 10b.

The curved second portion 10b follows a main radius of curvature RP, which is shown in FIG. 3 and which will be described below. Moreover, according to the example embodiment shown, all the portions 10a, 10b, 10c composing the light guide 10 are made of the same material and integrally formed, i.e. they form a unitary assembly forming a light guide containing no discontinuities. According to one variant embodiment, only the second portion 10b and the third portion 10c are made of the same material and integrally formed, the first portion 10a then being added.

The first portion 10a has a radius of curvature larger than the main radius of curvature RP followed by the curve of the second portion 10b. More precisely, in the illustrated example, the first portion 10a is substantially rectilinear. By substantially, what is meant is that the first portion 10a is rectilinear to within manufacturing tolerances.

In the same way, the third portion 10c has a radius of curvature larger than the main radius of curvature RP followed by the curve of the second portion 10b, and, in the illustrated example, the third portion 10c is substantially rectilinear.

A slit 15 is produced in the second portion 10b of the light guide 10. The slit 15 divides the second portion 10b of the light guide 10 into at least two sub-guides 11, 12, a first sub-guide 11 located on the inside of the curve and a second sub-guide 12 located on the outside of the curve. The sub-guides 11, 12 end up joining, in the direction of propagation of the rays, i.e. the direction defined above, so as to form the third portion 10c of the light guide 10. More precisely, the sub-guides 11, 12 join at the end of the second portion 10b of the light guide 10, i.e. at the end of the curve followed by the second portion 10b. The end of the curve is defined when a tangent to the curve is very close to a main axis of elongation C of the third portion 10c, without however being coincident with this main axis of elongation C. By join, what is meant is that the sub-guides 11, 12 are made of the same material and integrally formed in order to form only a single guide.

As may be seen in the figures, and in particular FIG. 2, the slit 15 and the sub-guides 11, 12 begin at the junction between the first portion 10a and the second portion 10b of the light guide 10. In other words, according to one embodiment, the slit 15 is produced only in the second portion 10b, i.e. in the curved portion, of the light guide 10.

FIG. 3 shows a segment of the light guide according to the invention, and in particular its curved second portion 10b. This segment of the guide is illustrated by the shaded portion, and the various radii of curvature of each of the walls defining this curved segment 10b have been schematically represented with dashed lines, these lines in particular being theoretically extended out of the guide in order to make it easier to see each of the radii of curvature. FIG. 3 also shows that the slit 15 is bounded by walls both of the first sub-guide 11 and of the second sub-guide 12. In other words, the sub-guides 11, 12 extend along the length of the slit 15.

More particularly, the first sub-guide 11, called the internal sub-guide, has what is called an internal wall 11a, i.e. the wall located the furthest toward the inside of the curve followed by the second portion 10b of the light guide 10, and what is called an external wall 11b, i.e. the wall located the furthest toward the outside of this curve. It will be noted that the internal wall 11a follows a first radius of curvature R11a that is smaller than the second radius of curvature R11b followed by the external wall 11b, these radii of curvature R11a, R11b being radii of concentric circles i.e. circles having the same center O. It is then possible to define a first general radius of curvature R11 of the first sub-guide 11, this first general radius of curvature being the mean of the first radius of curvature R11a and of the second radius of curvature R11b.

In the same way, the second sub-guide 12, called the external sub-guide, has what is called an internal wall 12a, i.e. the wall located furthest toward the inside of the curve, and what is called an external wall 12b, i.e. the wall located furthest toward the outside of the curve. It will be noted that the internal wall 12a follows a third radius of curvature R12a that is smaller than the fourth radius of curvature R12b followed by the external wall 12b, these radii of curvature R12a, R12b being radii of concentric circles, i.e. circles having the same center O. It is then possible to define a second general radius of curvature R12 of the second sub-guide 12, this second general radius of curvature being the mean of the third radius of curvature R12a and the fourth radius of curvature R12b.

It will be noted that the first general radius of curvature R11 of the first sub-guide 11 and the second general radius of curvature R12 of the second sub-guide 12 are both measured in concentric circles of center O. The first general radius of curvature R11 of the first sub-guide 11 is smaller than the second general radius of curvature R12 of the second sub-guide 12.

Such as was mentioned above, it will be noted that the external wall 11b of the first sub-guide 11 and the internal wall 12a of the second sub-guide 12 participate together to define the slit 15.

It will also be noted that the slit 15 has a crescent shape the length of which extends along a radius of curvature called the main radius of curvature RF of the slit. This main radius of curvature RF of the slit is the mean of the first general radius of curvature R11 of the first sub-guide 11 and of the second general radius of curvature R12 of the second sub-guide 12. In other words, the slit 15 has a main radius of curvature RF equal to the mean of the general radii of curvature of two adjacent sub-guides 11, 12. More particularly, the main radius of curvature RF of the slit is measured in a circle that is concentric with the circles defining the radii of curvature R11a, R11b, R11 of the first sub-guide 11 and/or with the circles defining the radii of curvature R12a, R12b, R12 of the second sub-guide 12.

In their direction of elongation, the sub-guides 11, 12 extend both along the length and in the direction of the curved shape of the slit 15.

It is also possible to define that the curve followed by the second portion 10b has a main radius of curvature RP that is a mean of the smallest radius of curvature of one of the sub-guides and of the largest radius of curvature of one of the sub-guides. According to the example embodiment illustrated by FIG. 2, in which there is one single slit 15, the main radius of curvature RP is coincident with the main radius of curvature RF of the slit. It will be understood that an offset may exist between the main radius of curvature RP of the guide and the main radius of curvature RF of the slit, these two radii of curvature being inscribed in concentric circles having the same center O.

In one variant (not shown), certain of the circles described in the context of FIG. 3 may not be concentric, i.e. their respective centers may be located in different locations.

The main radius of curvature RP of the curve followed by the second portion 10b of the light guide 10 may be smaller than or equal to N times one diameter D of the guide, with N possibly varying depending on the refractive index of the material from which the light guide 10 is made, N possibly in particular being comprised between 4 to 5. Such a radius of curvature is said to be small, but the presence of one or more slits 15 extending at least in the curved second portion 10b of the guide 10 allows any shadowed zone to be avoided while ensuring a good optical efficiency, as will be described with reference to FIG. 4. The diameter D of the guide 10 is in particular measured in a transverse cross section of the guide, which cross section is cut through the first 10a or in the third 10c portion of the light guide 10.

According to the invention, the light guide has, from one end to the other in the elongation direction, transverse dimensions such that the light guide is contained in an envelope of diameter equal to or slightly larger than this diameter D. It will be understood that in the curved second portion 10b of the guide, the sum of the lateral dimensions, or widths, of the sub-guides 11, 12 is smaller than, or substantially equal, to this diameter D. In practice, the difference between the diameter and the sum of the lateral dimensions, or widths, of the sub-guides is equal to the lateral dimension, or width, of the slit. This feature will in particular be described in other words below, with reference to FIG. 5.

The light guide 10 may in particular be the a single object, made of transparent polymer, and for example of polycarbonate (PC) or polymethyl methacrylate (PMMA), or any other suitable polymer, i.e. from a transparent material through which the light rays emitted by the light source 40 may pass. The mentioned materials have different thermal resistances while having optical performance levels that allow light rays to be propagated. It will be noted that PMMA has a better transparency with respect to PC. The refractive index of polycarbonate (PC) is substantially equal to 1.59, and the refractive index of polymethyl methacrylate (PMMA) is substantially equal to 1.49. It should be noted that the higher the index of the material used to manufacture the light guides, the lower the ratio between the radius of curvature and the diameter of the guide, namely the aforementioned value of N, may be. Experiments have shown that such a ratio ranging from 4 for polycarbonate (PC) to 5 for polymethyl methacrylate (PMMA) is acceptable both as regards photometric efficiency and as regards the illuminated appearance of the dogleg. The shadowed zone on the inside of the curved portion such as it was possible to present it above is then sufficiently small.

FIG. 4 schematically illustrates the path taken by the light rays, in particular within the curved second portion 10b of the light guide 10 according to the invention. In order to better differentiate them, each ray has been represented with a different style of line.

Firstly, it may be seen that the presence of the slit 15 allows, with respect to the prior art, an additional reflecting surface to be obtained. More precisely, following the light ray referenced 50, it may be seen that after total reflections in the first portion 10a of the light guide 10, the light ray 50 is totally reflected by the external wall 11b of the first sub-guide 11 in the direction of the internal wall 11a of the first sub-guide 11, i.e. toward the hollow of the curve followed by the second portion 10b of the guide. Thus, the presence of the slit 15 allows light rays to be directed in the direction of an internal zone 5 located in the hollow of the second portion 10b and thus allows the presence of a shadow in this internal zone 5 to be avoided, even when this curved portion follows a small radius of curvature.

Next, following the light ray referenced 51, it may be seen that after total reflections in the first portion 10a of the light guide 10, the light ray 51 is totally reflected by the external wall 12b of the second sub-guide 12 toward the internal wall 12a of the second sub-guide 12, i.e. toward the inside of the light guide 10.

Thus, the presence of the slit 15 and the division of the light guide 10 into a plurality of sub-guides at least in the curved second portion 10b makes it possible both to remove the zone called the shadowed zone and to significantly decrease the loss of light due to refraction of light rays in the curve second portion 10b, while nonetheless ensuring that the propagation of the light rays through each of the sub-guides on either side of the slit remains uniform.

According to one variant embodiment (not illustrated in the figures), the light guide 10 may comprise a plurality of slits 15 produced at least in the curved second portion 10b of the light guide 10, these slits being offset with respect to one another in this curved portion so as to be successively further and further away from the internal zone 5. These slits 15 then define at least three sub-guides. The slits 15 have, with respect to one another, main slit radii of curvature RF of different sizes, these radii respectively being inscribed in concentric circles and being equal to the mean of the general radii of curvature of the two adjacent sub-guides.

In the context of this variant, the sub-guides may have, with respect to one another, cross sections that are different. By this, what is meant is that a width of the sub-guides varies from one sub-guide to another. In other words, the slits 15 are not regularly distributed between each sub-guide. This allows a maximum of light rays to be concentrated in the zone called the shadowed zone, which is located in the hollow of the curve followed by the second portion 10b of the light guide 10. Preferably, the sub-guide having the smallest general radius of curvature has the smallest width with respect to all of the sub-guides, and the sub-guide having the largest general radius of curvature has the largest width with respect to all the sub-guides. According to one embodiment, the width of the sub-guides increases with distance from the hollow of the curve. Of course, all of the width measurements are carried out in the same plane, this plane being perpendicular to the direction of elongation of the sub-guide in question. Furthermore, it will be understood that when the sub-guides 11,12 have circular cross sections, the dimension to be considered is the diameter of these sub-guides.

According to one embodiment, the sub-guide having the smallest general radius of curvature, i.e. the internal sub-guide 11 located the closest to the hollow of the curve followed by the second portion 10b, may have a width smaller than the width of another sub-guide, and in particular smaller than the width of a sub-guide having the largest general radius of curvature, i.e. the external sub-guide 12 that is furthest from the hollow of the curve followed by the second portion 10b. It will be understood that the width of a sub-guide is measured in a substantially right cross section of said given sub-guide, a right cross section being defined as being a transverse cross section that is perpendicular to the direction of elongation of the given sub-guide. In the case where the sub-guides 11,12 have a circular cross section, it will be understood that the width measured consists in the diameter of each sub-guide.

Figure 5:
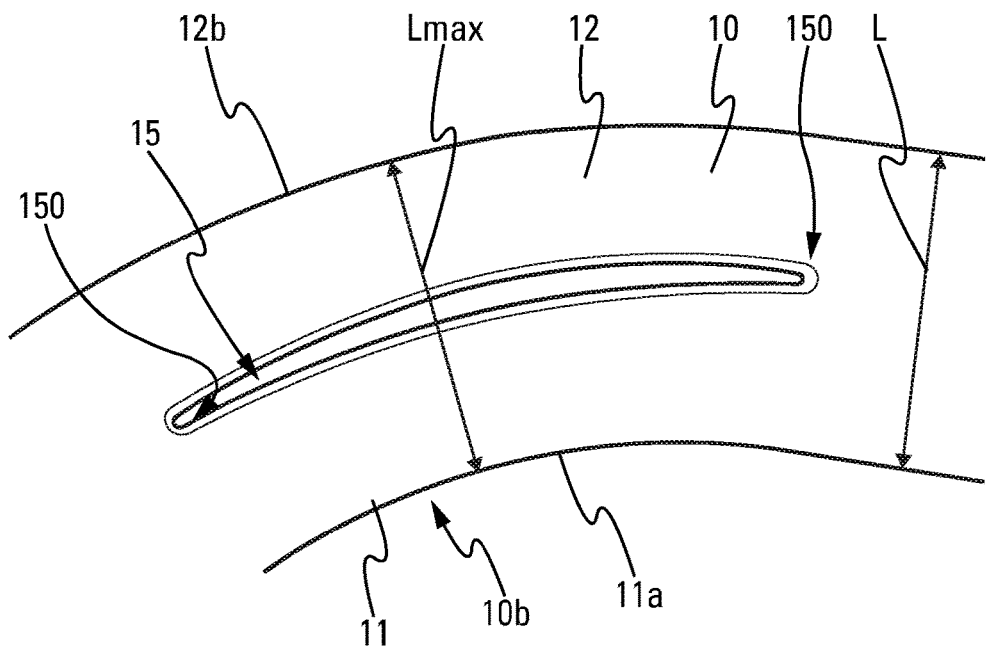
FIG. 5 is a top view of the curved portion of the light guide according to the present invention, showing a second embodiment of a slit produced in the curved portion of the light guide.

FIG. 5 shows that a maximum width Lmax of the light guide 10 is measured in a plane that is transverse to the light guide 10 and perpendicular to the axis of elongation of the guide 10. In other words, the maximum width Lmax is measured in a right cross section of the light guide 10. More precisely, the maximum width Lmax of the second portion 10b is measured between the internal wall 11a of the first sub-guide 11, i.e. the guide located closest to the hollow of the curve, and the external wall 12b of the second sub-guide 12, i.e. the guide located furthest from the hollow of the curve. The width Lmax of the second portion 10b of the light guide 10 is generally slightly larger than the width L measured in the first portion 10a and/or in the third portion 10c of the light guide 10. The difference in width between the second portion 10b and the other portions 10a, 10c of the guide is comprised between 1 millimeter and 20 millimeters, and in particular between 2 millimeters and 10 millimeters. According to one variant embodiment, the width L is constant in all the portions 10a, 10b, 10c of the light guide 10, i.e. the width Lmax is equal to the width L. This constancy of width L makes it possible to ensure that the light guide 10 has a minimum bulk.

For the sake of bulk, it will also be noted that the light guide 10 and the sub-guides 11, 12 have an identical height.

Moreover, FIG. 5 illustrates an embodiment in which the slit 15 has two rounded longitudinal ends 150, whereas in the embodiment illustrated by FIG. 3 or 4, the two longitudinal ends 150 of the slit 15 are beveled. A longitudinal end 150 is defined as being the point of origin of the slit 15. Depending on the shape of the slit 15, this point of origin may be located on the main radius of curvature RF of this slit. It will be noted that rounded longitudinal ends 150 make it easier to mold and unmold the sub-guides 11, 12 during the manufacture of the light guide 10.

Between these two longitudinal ends 150, the slit 15 may have a width that increases (as for example shown in FIG. 4) or a constant width, the width being defined according to the above reference system. Preferably, the slit 15 has a minimum width of at least two millimeters. This minimum width, here at least two millimeters, participates in ensuring that the light guide 10 is molded well and released well from the mold during manufacture. The width of the slit 15 is measured in a transverse plane perpendicular to the principal axis of extension of the slit 15, this plane being situated preferably mid-way along the slit 15.

FIGS. 6B to 6D show right cross sections of various variant embodiments of the sub-guides 11, 12 of the invention, cut along the line AA shown in FIG. 3, in comparison with FIG. 6A which shows a right cross section of the light guide 10 cut along the line BB shown in FIG. 3, i.e. cut in the first portion 10a or in the third portion 10c of the light guide 10. It will be noted that the sub-guides may have transverse cross sections of semicircular shape (FIG. 6B), circular shape, elliptical shape (FIGS. 6C and 6D), oval shape or even of rectangular or trapezoidal shape, the latter having sharp or rounded corners between adjacent sides. By rounded corner, what is meant is that two adjacent sides of the rectangle or trapezoid are joined by a fillet.

FIG. 6B, in which each sub-guide 11, 12 has a semicircular transverse cross section, shows that the external wall 11b of the first sub-guide 11 and the internal wall 12a of the second sub-guide 12, which both participate in delineating the slit 15, have planar faces that extend in planes that are parallel to each other. In this cross section, the slit 15 has a rectangular shape and passes right through the light guide 10, in particular heightwise, the height of the guide being defined as above.

FIG. 6C, in which each sub-guide 11, 12 has an elliptical transverse cross section, shows that the external wall 11b of the first sub-guide 11 and the internal wall 12a of the second sub-guide 12, which both participate in delineating the slit 15, have faces the shapes of which are elliptic sections. In the right cross section illustrated, the slit 15 then has a shape that passes right through the light guide 10 that has a minimum width toward the middle of the guide in the heightwise direction.

According to one embodiment illustrated by FIGS. 2 to 6C, the slit 15 passes right through the light guide 10 and in particular the second portion 10b so as to separate the sub-guides 11, 12 from each other. Thus, the sub-guides 11, 12 are independent from each other. It is also possible to state that the slit 15 defines a passage between two adjacent sub-guides 11, 12, this passage extending the entire height of the light guide 10 such as defined in the reference system. In other words, the slit 15 extends the entire height of the light guide 10.

As a variant, the external wall 11b of the first sub-guide 11 and the internal wall 12a of the second sub-guide 12 have curved shapes that are different from an ellipse. Advantageously the curved shapes are such that, from the bottom of the height of the guide to the top, the width of the slit decreases then increases once again. Alternatively, this width could only decrease or only increase.

Another embodiment, which is illustrated by FIG. 6D, shows that the light guide 10, and in particular the second portion 10b, comprises a bridge of material 100 extending between two adjacent sub-guides 11, 12. The sub-guides 11, 12 here have an ellipse-shaped cross section, but could, of course, have any other cross section, such as, in particular, a semicircular cross section. In other words, two slits 15 may be said to be produced on either side of the bridge of material 100. These two slits 15 have main radii of curvature such as was defined above that are the same. In the example illustrated by FIG. 6D the two slits 15 are symmetric one with respect to the other and with respect to the bridge of material 100, which moreover makes it possible to ensure that the sub-guides 11, 12 hold together mechanically in case of vibrations. In an alternative embodiment, the two slits 15 are dissymmetric with respect to the bridge of material 100, one of them presenting a greater dimension than the other one, i.e. the bridge of material 100 is not centered. In another alternative embodiment, the bridge of material 100 is situated at one extremity of the sub-guides 11, 12, for example tangent to the two sub-guides 11, 12. There is then only one slit 15, especially a non-open slit 15 where one bridge of material 100 is present.

Advantageously, the bridge of material 100 has a height, such as defined above, at least 4 times smaller than the height of the light guide 10, so that the maximum thickness of the bridge of material is smaller than one quarter of the height of the light guide. This ratio makes it possible to ensure that the bridge of material 100 is small with respect to the guide 10 so that it has no optical effect on the propagation of the light rays through the sub-guides 11, 12. Advantageously, the bridge of material 100 represents less than 20% of the diameter D of one of the sub-guides 11, 12 from which the bridge of material 100 extends. Moreover, it is desirable to ensure that this bridge has a height of the least 1 or 2 mm in order to ensure it molds well.

Advantageously, the bridge of material extends the entire length of the slit. As a variant, it may comprise one or more interruptions in the direction of propagation of the light rays.

In the various illustrated example, it will be noted that the cross sections of the sub-guides 11, 12 are symmetric with respect to each other with, in particular, the slit 15 defining the axis of symmetry, though it should be noted that this feature is optional.

Moreover, FIGS. 7A and 8A, which show the light guide seen from below and according to two embodiments of the invention, show that the light guide 10 has, in all of its portions 10a, 10b and 10c, an irregular lower face 16 on which elements 13 that permit the reflection of the light rays are placed. These reflecting elements 13 allow rectilinear propagation of the light rays along the length of the light guide 10 to be avoided and impose on the light rays angles of reflection allowing refraction at the opposite face, i.e. at an exit face of the light guide 10.

These elements 13 are placed at least on one portion of the walls bounding the light guide 10. The elements 13 permitting reflection are for example prisms produced in the reflecting face of the light guide 10. These prisms may be distributed uniformly along the length of the light guide 10.

When the light guide 10 divides into sub-guides 11, 12, the reflecting elements 13 also divide into reflecting sub-elements 130. More precisely, FIGS. 7B and 7C, which illustrate cross sections of the light guide 10 shown in FIG.

7A, show that these reflecting sub-elements 130 extend on either side of the slit 15 and have a width LS strictly smaller than the width LE of a reflecting element 13 located in the first portion 10a or the third portion 10c. Advantageously the width LS is substantially equal to half the width LE. According to this example embodiment in which the sub-guides 11, 12 have a transverse cross section of semicircular shape, with a slit 15 that has a constant width over the entire height of the light guide, the reflecting sub-elements 130 are placed on the edge of this semicircle, relatively to the diameter D1. In other words, the reflecting sub-elements 130, adjacent to the slit 15, are separated from each other only by the width of the slit. Once the curved second portion 10b has passed, i.e. from the very beginning of the third portion 10c, the reflecting sub-elements 130 join to form only one reflecting element 13, which, preferably, has the same dimensions and properties as the reflecting elements located in the first portion 10a of the guide 10.

These FIGS. 7B and 7C also shown that the light guide 10 comprises an upper face 17, called the exit face, through which the light rays are reflected in order to exit from the light guide 10. This exit face 17 is distinct from the lower face 16, which is called the reflecting face, these faces here being located opposite each other. In other words, the reflecting face 16 and the exit face 17 are diametrically opposite. It will be noted that the presence of the slit 15 and the division of the guide 10 into sub-guides 11, 12 allow the leakage of light rays through faces of the light guide 10 other than the exit face 17 to be limited.

FIG. 8A shows a variant embodiment in which the reflecting sub-elements 130 are placed on the reflecting face 16 of each sub-guide 11, 12, this time centrally transversely with respect to each sub-guide, at the very least in the central portion of the second portion of the light guide, when the cross section of the sub-guides is in its definitive form. As FIGS. 8B to 8D show, this variant embodiment is particularly well-suited in the case where the sub-guides have an ellipse-shaped cross section. Of course, this variant embodiment could be adapted to sub-guides 11, 12 with other types of cross section.

It will be noted that in the curved second portion 10b of the light guide 10, the reflecting sub-elements 130 are placed in the middle of the reflecting face 16 of the sub-guide 11, 12. More precisely, as FIG. 8D shows, the reflecting sub-elements 130 are placed on the major axis D2 of the ellipse formed by a sub-guide 11, 12.

FIG. 8C shows that the passage between the second portion 10b and the first portion 10a or the third portion 10c, which is illustrated by FIG. 8B, is gradual. More particularly, the beginning of the sub-guides 11, 12 and of the slit 15 may be seen in FIG. 8C. It will be noted that the reflecting sub-elements 130 are, from the start of the curve 10b, split apart.

Moreover, when the bridge of material 100 is present along the curve followed by the second portion 10b of the guide 10, this bridge of material 100 may have reflecting elements 13 on at least one of its faces. Preferably, the face of the bridge of material 100 comprising the reflecting elements 13 is the face located opposite the exit face 17 of the sub-guides 11, 12.

FIG. 9 illustrates a light guide 10 according to the invention, which light guide is intended to be integrated into a motor-vehicle lighting module. This light guide 10 comprises two ends 30a, 30b and a plurality of curved portions 10b. A light source may be provided facing each of the ends 30a, 30b of the light guide. A slit 15 dividing the light guide 10 into a plurality of sub-light guides 11, 12 is produced in at least one of these curved portions 10b. Of course, the light guide 10 may comprise a slit 15 dividing the light guide 10 into a plurality of sub-guides 11, 12 in each of its curved portions 10b.

The above description clearly explains how the invention allows the objectives that were set therefore to be achieved and in particular how the invention allows a curved light guide the visual appearance of which is controllable to be provided by removing the shadowy zone when the radius of curvature is small and by limiting the refraction of light rays in undesired zones of the light guide. Such a light guide 10 may advantageously be integrated into a motor-vehicle lighting module and optical efficiency will then be optimal for producing the desired lighting and/or signaling function. In a lighting module according to one aspect of the invention, the guide may be directly visible from the exterior through the outer lens of the device. Advantageously, it is placed behind a translucent or transparent screen that scatters light either because of the presence of a texture or optical patterns on its surface, or because it is made from a scattering material, or even because of a combination of these features.

The invention claimed is:

1. A light guide for a lighting module of a motor vehicle configured to propagate light rays emitted from at least one light source, the light guide comprising at least three successive portions in a direction of propagation of the light rays from the one or more light sources, wherein the three successive portions comprise:
   a first portion;
   a second portion located immediately after the first portion, the second portion following a curve defined by a main radius of curvature; and
   a third portion located immediately after the second portion;
   wherein at least one slit is produced in the second portion, the one or more slits defining at least two sub-guides, the sub-guides joining so as to form the third portion of the light guide, and the first portion and the third portion of the light guide include reflecting elements distributed uniformly along a length of the first portion and the third portion of the light guide, the second portion of the light guide includes a reflecting sub-element separate from the reflecting elements of the first and third portion, deposited on each side of the at least one slit of the at least two sub-guides and following the shape of the at least one slit, the reflecting sub-elements having a width smaller than a width of the reflecting elements.

2. The light guide according to claim 1, wherein the reflecting elements are prisms produced in a reflecting face of the light guide.

3. The light guide according to claim 1, wherein each sub-guide has a radius of curvature, called its general radius of curvature, that is inscribed in a circle concentric with a circle wherein the main radius of curvature defining the curve followed by the second portion is inscribed.

4. The light guide according to claim 1, wherein the at least one slit follows a main radius of curvature that is coincident with the main radius of curvature defining the curve followed by the second portion.

5. The light guide according to claim 1, wherein the at least one slit has at least one beveled or rounded end.

6. The light guide according to claim 1, wherein the light guide has a maximum width that is constant in at the least three successive portions.

7. The light guide according to claim 1, wherein the first portion of the light guide has a main radius of curvature that is larger than the main radius of curvature followed by the second portion.

8. The light guide according to claim 1, wherein the third portion of the light guide has a radius of curvature that is larger than the main radius of curvature followed by the second portion.

9. The light guide according to claim 1, wherein the sub-guides have widths, or diameters, that are different from one another.

10. The light guide according to claim 9, wherein the sub-guide having a general radius of curvature has a width or a diameter smaller than the sub-guide having a larger general radius of curvature.

11. The light guide according to claim 1, wherein each sub-guide has a right transverse cross section of semicircular or circular or elliptical or rectangular or oval or trapezoidal shape.

12. The light guide according to claim 1, wherein the at least one slit extends through a height of the light guide.

13. The light guide according to claim 1, wherein the light guide further comprises a bridge of material extending between two adjacent sub-guides of the at least two sub-guides.

14. The light guide according to claim 1, wherein the main radius of curvature followed by the second portion is smaller than or equal to N times one diameter of the light guide, with N being dependent on the refractive index of the material used to produce said light guide.

15. A motor-vehicle lighting module comprising:
  a light guide such as defined according to claim 1, and
  a light source, the light source being placed at one end of the light guide.

16. The light guide according to claim 1, wherein the second portion and the third portion are made of the same material and integrally formed.

17. The light guide according to claim 16, wherein each sub-guide has a radius of curvature, called its general radius of curvature, that is inscribed in a circle concentric with a circle wherein the main radius of curvature defining the curve followed by the second portion is inscribed.

18. The light guide according to claim 16, wherein the at least one slit follows a main radius of curvature that is coincident with the main radius of curvature defining the curve followed by the second portion.

19. The light guide according to claim 16, wherein the at least one slit has at least one beveled or rounded end.

20. The light guide according to claim 16, wherein the light guide has a maximum width that is constant in at least the three successive portions.

* * * * *